(12) United States Patent
Niimi (10) Patent No.: US 8,361,669 B2
(45) Date of Patent: Jan. 29, 2013

(54) FUEL-CELL-EQUIPPED APPARATUS WITH A FUEL CELL UNIT SUPPORTED BY THREE POINTS

(75) Inventor: Haruhisa Niimi, Tokai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1396 days.

(21) Appl. No.: 11/989,638

(22) PCT Filed: Aug. 2, 2006

(86) PCT No.: PCT/IB2006/002094
§ 371 (c)(1),
(2), (4) Date: Jan. 29, 2008

(87) PCT Pub. No.: WO2007/015142
PCT Pub. Date: Feb. 8, 2007

(65) Prior Publication Data
US 2009/0286129 A1    Nov. 19, 2009

(30) Foreign Application Priority Data
Aug. 4, 2005 (JP) ................................. 2005-226531

(51) Int. Cl.
*H01M 2/10* (2006.01)
(52) U.S. Cl. ........................................ 429/452; 429/535
(58) Field of Classification Search .................. None
See application file for complete search history.

(56) References Cited

U.S. PATENT DOCUMENTS

| 6,479,180 B1 * | 11/2002 | Uozumi ........................ 429/469 |
| 2002/0031697 A1 | 3/2002 | Sugita et al. |
| 2002/0187380 A1 * | 12/2002 | Tanaka et al. .................. 429/34 |

FOREIGN PATENT DOCUMENTS

| DE | 100 33 989 A1 | 5/2002 |
| DE | 102 24 962 A1 | 2/2003 |
| JP | 2002-093454 A | 3/2002 |
| JP | 2002-235801 A1 | 8/2002 |
| JP | 2002-367651 A | 12/2002 |
| JP | 2002-367652 A | 12/2002 |
| JP | 2002-367664 A | 12/2002 |
| WO | WO 2004/105172 A | 12/2004 |

OTHER PUBLICATIONS

Japanese Office Action dated May 16, 2011 of JP 2005-226531 and translation thereof.

* cited by examiner

*Primary Examiner* — Barbara Gilliam
*Assistant Examiner* — Kwang Han
(74) *Attorney, Agent, or Firm* — Kenyon & Kenyon LLP (57) ABSTRACT

A fuel-cell-equipped apparatus includes a fuel cell unit that includes a fuel cell module and a fuel cell case. The fuel cell module includes cells stacked on each other and is housed in the fuel cell case. A pipe is provided at one side of the fuel cell module in the direction in which the cells are stacked. The fuel cell unit is supported on a base via supporting members (mounting insulators), at two points at the side where the pipe is provided or the side closest to a gravity center of the fuel cell unit and at one point in the opposite side.

13 Claims, 7 Drawing Sheets

FIG. 8

FUEL-CELL-EQUIPPED APPARATUS WITH A FUEL CELL UNIT SUPPORTED BY THREE POINTS

This is a 371 national phase application of PCT/IB2006/002094 FILED 2 Aug. 2006, which claims priority to Japanese Patent Application No. 2005-226531 filed 4 Aug. 2005, the contents of which are incorporated herein by reference.

BACKGROUND OF THE INVENTION

1. Field of the Invention

The invention relates to a fuel-cell-equipped apparatus.

2. Description of the Related Art

Various technologies to mount a fuel cell unit to various types of apparatuses (such as vehicles, robots, ship and vessel, and aircraft) have been proposed to present. Generally, in a fuel cell unit to be mounted to an apparatus, a fuel cell module is housed in a case so as to be protected against external moisture and electromagnetic wave and to be electrically insulated. Further, in recent years, a technology has been proposed that a fuel cell is mounted to an apparatus though supporting members that include elastic members, such as rubber, in order to suppress vibration to the fuel cell input from the outside (For example, see Japanese Patent Application Publication No. JP-A-2002-235801).

However, in the technology disclosed in Japanese Patent Application Publication No. JP-A-2002-235801, the number of the supporting members and the positions at which the supporting members support the fuel cell unit have not been considered adequately. Therefore, it is necessary to enlarge the supporting members so as to suppress vibrations to the fuel cell. However, if the supporting members are merely enlarged, a space for accessories that are installed to the fuel cell unit cannot be secured, and therefore it becomes difficult to install them.

Further, document US 2002/031697 A1 discloses a fuel cell stack capable of giving improved impact resistance and vibration resistance without causing the space occupied by the fuel cell stack to be increased. In a fuel cell stack for mounting in a vehicle in which a plurality of fuel cell units, each of which is formed by interposing a solid polymer electrolyte membrane between an anode electrode and a cathode electrode, are stacked in a horizontal direction with separators placed between each, mounting members used for installation are provided at backup plates that are outside fastening structure portions that are provided at both ends along the direction in which the fuel cell units are stacked, and an intermediate supporting member used for installation is additionally provided at an intermediate portion along the direction in which the fuel cell units are stacked.

Document US 2002/0187380 A1 discloses another fuel cell arrangement. There, a housing case that houses a fuel cell is provided with mounts for fixing two ends of a lower surface of an end plate that retains stacked unit cells of the fuel cell, and a mount for fixing a central portion of a lower surface of another end plate. Using these three mounts, the fuel cell is fixed to the housing case.

SUMMARY OF THE INVENTION

It is an object of the invention to reduce the size of a fuel cell unit and its supporting members and thereby to enable the fuel cell unit and its accessories to be mounted or installed easily.

A first aspect of the invention relates to a fuel-cell-equipped apparatus including a fuel cell unit which includes a fuel cell stack including a plurality of cells and a pipe provided at or near an end of the fuel cell stack in a direction that the cells are stacked, and a plurality of supporting members via which the fuel cell unit is supported on a base. The fuel cell unit is supported on the base at two points at a side of the fuel cell unit where the pipe is provided and at one point at a side of the fuel cell unit which is opposite to the side where the pipe is provided.

According to the first aspect of the invention, the fuel cell unit is supported at two points in the side close to its gravity center and at one point at the opposite side (the gravity center of a fuel cell unit, due to the weight of pipes and the like, is to the side where the pipes, and the like, are provided, with respect to the center of the fuel cell unit in the direction in which the cells are stacked). Therefore, the load of the fuel cell unit can be distributed to the respective supporting points and thus can be made small for each point. Also, supporting the fuel cell unit at three points in this way allows the supporting members to be made small in size, making it easy to mount or install the fuel cell unit and its accessories. Further, since the plane defined by the supporting points can be uniquely identified, the direction and distance of the movement of the plane can be easily estimated. This makes it possible, if the fuel cell unit includes a fuel cell module and a fuel cell case for housing it, for example, to optimize the shape of the fuel cell case, so that there is no need to unnecessarily enlarge the outer dimensions of the fuel cell case. As a result, the fuel cell unit can be made small in size, and the fuel cell unit can therefore be easily mounted.

In the fuel-cell unit, the fuel cell stack may be arranged in at least two rows and a pair of end plates may be provided to clamp the rows of the fuel cell stack from both sides. The end plate provided at the side where the pipe is provided may be arranged or formed so as to cover ends of all the rows of the fuel cell stack in the same side.

The supporting members provided at the side where the pipe is provided may be positioned in an area (e.g., positions near the ends of the end plate) other than a boundary between the rows of the fuel cell stack and a proximity thereof.

In this case, a space for arranging various accessories and pipes can be secured around the boundary between the rows of the fuel cell stack, enabling them to be easily mounted or installed to the fuel cell unit. Further, if the supporting members are provided near the ends of the end plate, respectively, the fuel cell unit can be more stably supported.

Furthermore, the fuel cell unit may include a fuel cell module including the fuel cell stack and a fuel cell case that houses the fuel cell module, so that the fuel cell case housing the fuel cell module is supported on the base via the supporting members. In this case, the fuel cell unit may be supported at two points close to a side face of the fuel cell case that is closest to the gravity center of the fuel cell unit and at a point close to a side face of the fuel cell case that is opposite to the side face closest to the gravity center of the fuel cell unit Furthermore, at least one of the supporting members may include a case supporting member which is provided below a bottom plate of the fuel cell case and via which the fuel cell case is supported on the base and a module supporting member which is provided on the bottom plate of the fuel cell case and via which the fuel cell module is supported on the bottom plate in the fuel cell case.

According to this structure, the load of the fuel cell module acts on the base through the case supporting member and the module supporting member. That is, it is possible to match the position on which the load of the fuel cell module acts and the position on which the load of the entire fuel cell unit including the fuel cell module acts. Therefore, an extra load to the fuel cell case (bending moment and the like), which is produced due to a difference between the position on which the load of the fuel cell module acts and the position on which the load of the entire fuel cell unit acts, can be reduced. As a result, the fuel cell case can be made thin, and the entire structure can be made light in weight and small in size.

The case supporting member and the module supporting member may have a common axis along a vertical direction.

A second aspect of the invention relates to a fuel-cell-equipped apparatus including a fuel cell unit that is supported on a base via supporting members. The fuel cell unit is supported at two points at a side of the fuel cell unit that is closest to a gravity center of the fuel cell unit and at one point at a side of the fuel cell unit which is opposite to the side closest to the gravity center of the fuel cell unit.

According to the second aspect of the invention, the fuel cell unit is supported at two points in the side close to its gravity center and at one point at the opposite side. Therefore, the load of the fuel cell unit can be distributed to the respective supporting points and thus can be made small for each point. Also, supporting the fuel cell unit at three points in this way allows the supporting members to be made small in size, making it easy to mount or install the fuel cell unit and accessories. Further, since the plane defined by the supporting points can be uniquely identified, the direction and distance of the movement of the plane can be easily estimated. This makes it possible, if the fuel cell unit includes a fuel cell module and a fuel cell case for housing it, for example, to optimize the shape of the fuel cell case, so that there is no need to unnecessarily enlarge the outer dimensions of the fuel cell case. As a result, the fuel cell unit can be made small in size, and the fuel cell unit can therefore be easily mounted.

The fuel cell unit may include a fuel cell module including a plurality of cells stacked on each other and a fuel cell case that houses the fuel cell module, so that the fuel cell case housing the fuel cell module is supported on the base via the supporting members. In this case, the fuel cell unit may be supported at two points close to a side face of the fuel cell case that is closest to the gravity center of the fuel cell unit and at a point close to a side face of the fuel cell case that is opposite to the side face closest to the gravity center of the fuel cell unit.

A third aspect of the invention relates to a fuel-cell-equipped apparatus which includes: a fuel cell unit including a fuel cell stack including a plurality of cells which are stacked on each other and a pipe that is provided at or near an end of the fuel cell stack in a direction that the cells are stacked; and supporting members via which the fuel cell unit is supported on a base. The fuel cell unit is supported on the base at two points at a side of the fuel cell unit where the pipe is provided and at one point at a side of the fuel cell unit that is opposite to the side where the pipe is provided.

A fourth aspect of the invention relates to a fuel-cell-equipped apparatus which includes a fuel cell unit and supporting members via which the fuel cell unit is supported on a base. The fuel cell unit is supported on the base at two points at a side of the fuel cell unit that is closest to a gravity center of the fuel cell unit and at one point at a side of the fuel cell unit that is opposite to the side closest to the gravity center of the fuel cell unit.

Accordingly, by setting an appropriate number of supporting members and arranging them at appropriate positions as in the first through fourth aspects of the invention, the fuel cell unit and the supporting members can be made small in size, making it easy to mount or install the fuel cell unit and its accessories.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

An apparatus equipped with a fuel cell unit (hereinafter, "fuel-cell-equipped apparatus") according to an embodiment of the invention will be described with reference to the drawings. In the embodiment, the fuel-cell-equipped apparatus is structured such that a fuel cell unit 1 is mounted on a base (members 68 in FIG. 6 and other drawings) provided in a fuel cell vehicle via supporting members (mounting insulators 15A to 15C; shown in FIG. 6 and other drawings).

First of all, the structure of the fuel cell unit 1 of the fuel-cell-equipped apparatus according to the embodiment will be described with reference to FIGS. 1 to 3.

Figure 1:
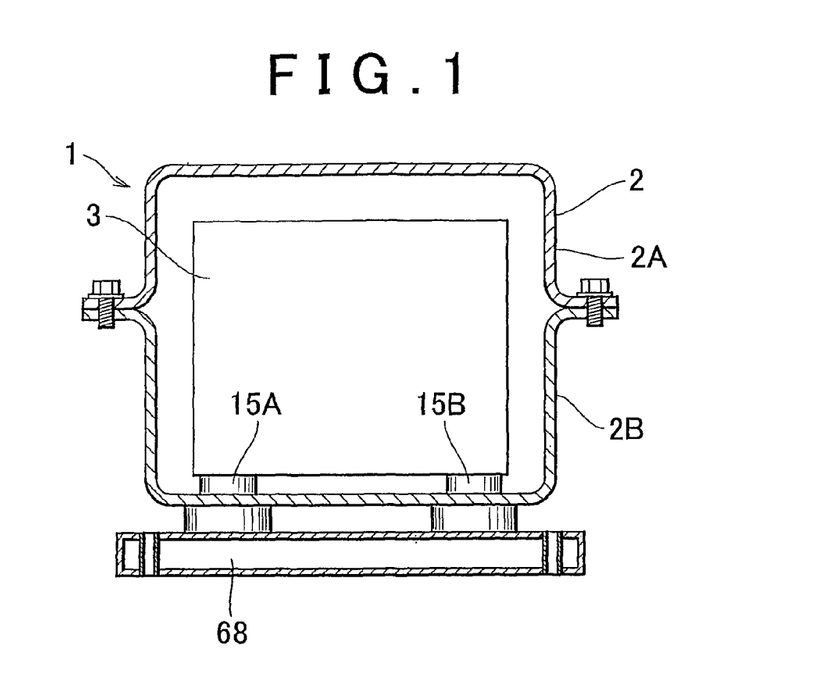
FIG. 1 is a sectional side view of a fuel cell unit of a fuel-cell-equipped apparatus according to the embodiment of the invention.
Figure 2:
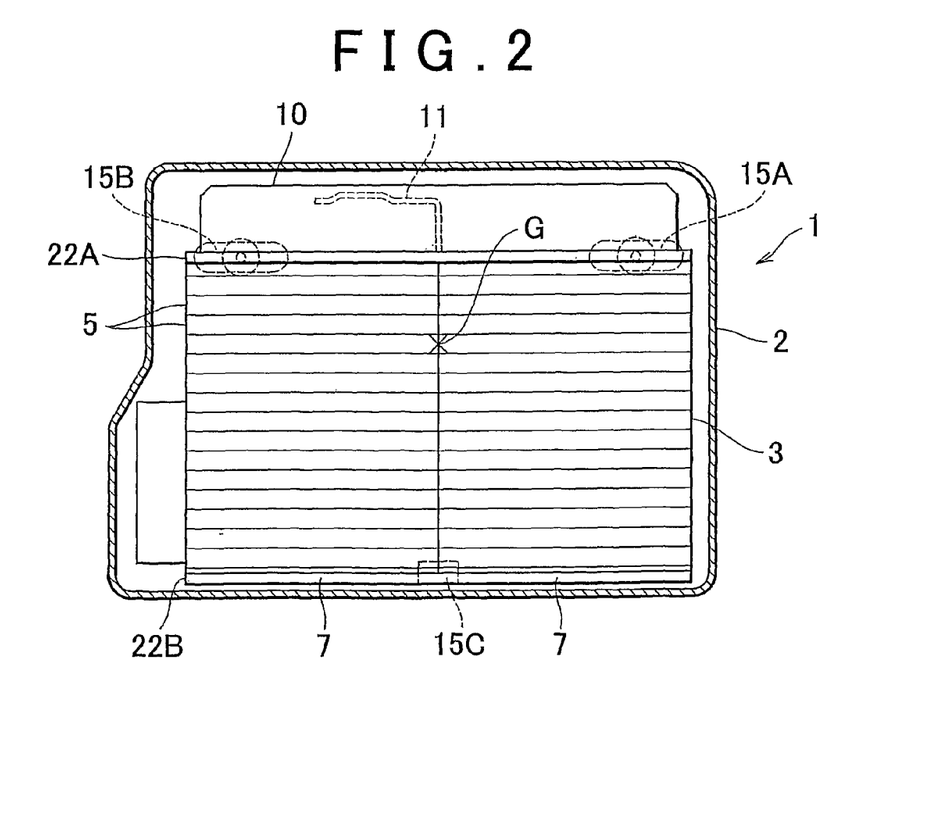
FIG. 2 is a plain view showing a fuel cell module that is disposed in the fuel cell unit shown in FIG. 1.
Figure 3:
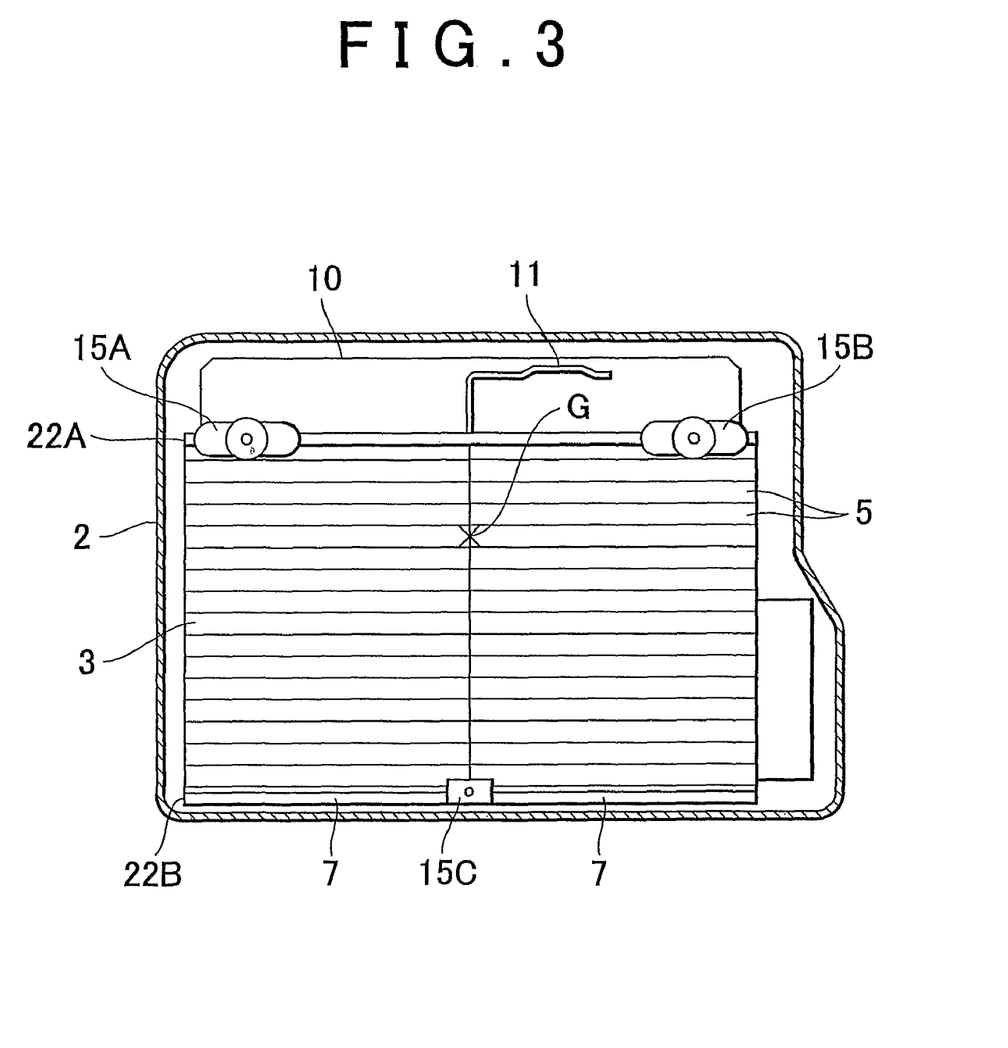
FIG. 3 is a bottom view of the fuel cell module that is disposed in the fuel cell unit shown in FIG. 1.

As shown in FIGS. 1 to 3, the fuel cell unit 1 includes a fuel cell case 2 and a fuel cell module 3, and the fuel cell module 3 is fixed inside the fuel cell case 2. The fuel cell case 2 is structured, as shown in FIG. 1, such that an upper case 2A and a lower case 2B are hermetically fixed to each other, and has high electromagnetic shielding performance, air tightness, and fluid tightness. The upper case 2A constitutes the upper half of the fuel cell case 2, and the lower case 2B constitutes the lower half. The fuel cell case 2 houses accessories associated with the fuel cell module 3, such as a connector and a cell monitor, as well as the fuel cell module 3.

As shown in FIGS. 2 and 3, the fuel cell module 3 includes a stack body including a plurality of cells 5 which are stacked on top of each other. Each of the cells 5 includes a membrane-electrode assembly (MEA) and separators. End plates 22A, 22B are provided at both ends of the stack body. The stack body is sandwiched between the end plates 22A, 22B, so that a clamping force acts on the stack body in the stacking direction of the cells, and fixing members (for example, tension plates) that extend in the stacking direction of the cells outside the stack body are fixed to the end plates 22A, 22B, respectively, whereby a fuel cell stack 7 is structured. In the embodiment, the fuel cell stack 7 is arranged in two rows, and the end plates 22A, 22B are shared by the two rows of the fuel cell stacks 7, that is, each of the end plates 22A, 22B covers the ends of the two rows in each side.

Further, as shown in FIGS. 2 and 3, a system auxiliary 10 is provided at one side of the fuel cell module 3 in the stacking direction of the cells. In the same side, a distributor pipe 11 extends outward from the boundary between the two rows of the fuel cell stack 7. The distributor pipe 11 serves as a passage of reaction gas and coolant that are supplied to the fuel cell module 3. As shown in FIGS. 2 and 3, a gravity center G of the fuel cell module 3, due to the weight of the distributor pipe 11, is closer to the distributor pipe 11 side than is the center of the fuel cell module 3 in the stacking direction of the cells. The distributor pipe 11 may be fixed, attached, or connected to the end plate 22A. The distributor pipe 11 may be provided either integrally with or separately from the end plate 22A.

Figure 6:
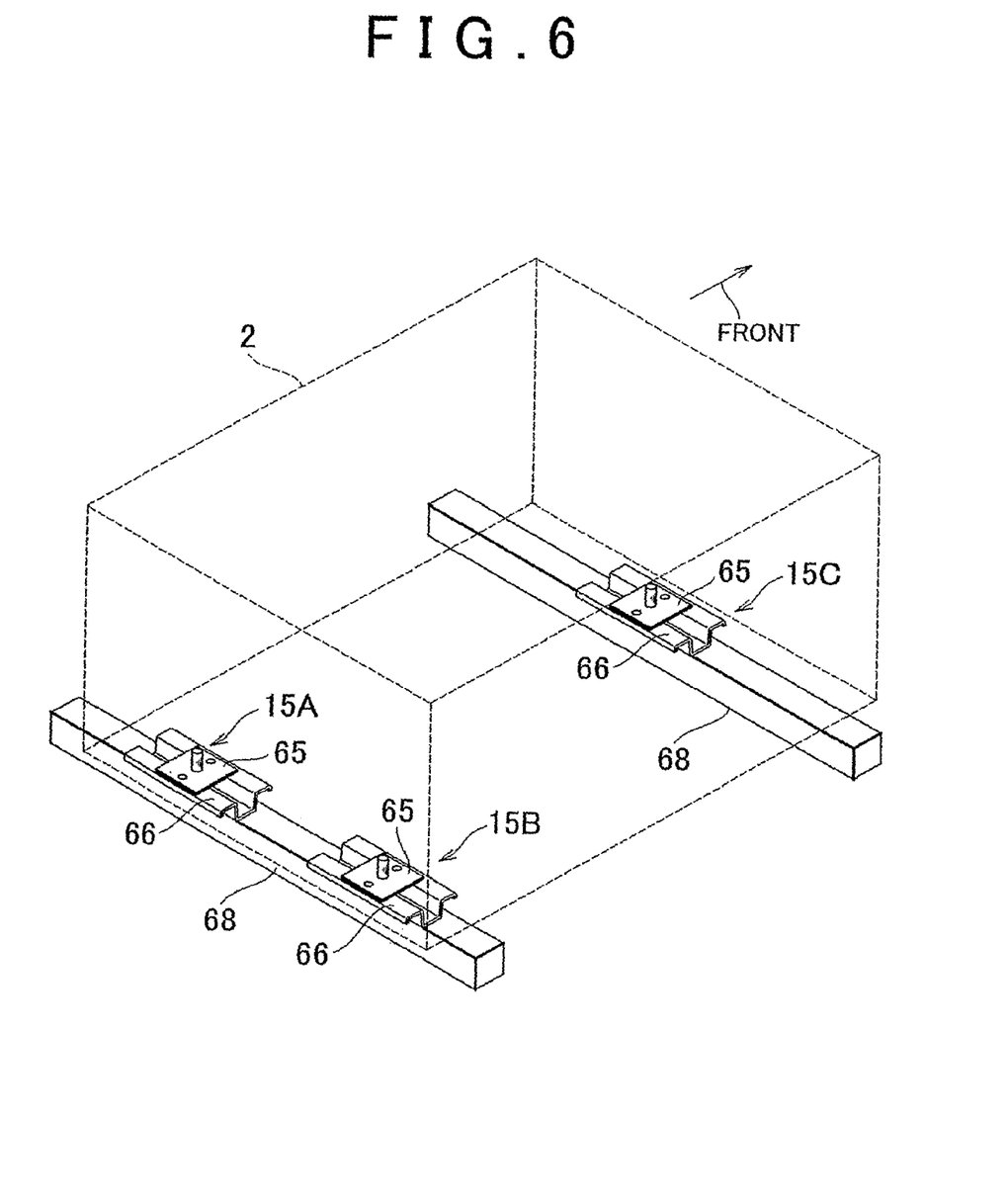
FIG. 6 is a perspective view of supporting members (mounting insulators) used for mounting the fuel cell unit shown in FIG. 1 to the fuel cell vehicle.

The mounting insulators 15A, 15B, 15C are fixed, as shown in FIG. 3, on a bottom surface of the fuel cell module 3. The mounting insulators 15A, 15B, 15C are used to fix the fuel cell unit 1 to a base (members 68 as shown in FIG. 6 and other drawings), and also to fix the fuel cell module 3 to the fuel cell case 2. Therefore, using the mounting insulators 15A to 15C, the fuel cell unit 1 is supported at three points. The mounting insulators 15A to 15C are one example of supporting members according to the invention. The structure of the mounting insulators 15A to 15C will be described in detail later.

In the embodiment, the mounting insulators 15A and 15B, as shown in FIG. 3, are provided near the side face of the fuel cell unit 1 that is closest to the gravity center G when the fuel cell unit 1 is mounted on the base, that is, the side face of the fuel cell unit 1 on which the system auxiliary 10 and the distributor pipe 11 are disposed. The mounting insulators 15A, 15B, which are located in the distributor pipe 11 side, are fixed to, as shown in FIG. 3, the portions of the end plate 22A near the ends thereof, respectively, thereby avoiding mounting the mounting insulators 15A, 15B to the area around the boundary between the two rows of the fuel cell stack 7. The mounting insulator 15C is provided near the side face of the fuel cell unit 1 which is opposite to the side face that is closest to the gravity center G, and near the boundary between the two rows of the fuel cell stack 7. The mounting insulator 15C is fixed to the end plate 22B. The reason why the mounting insulators 15A to 15C are fixed o the end plates 22A, 22B is that the rigidity of the end plates 22A, 22B is high.

Next, the arrangement of the fuel cell unit 1 will be described with reference to FIGS. 4 and 5.

Figure 4:
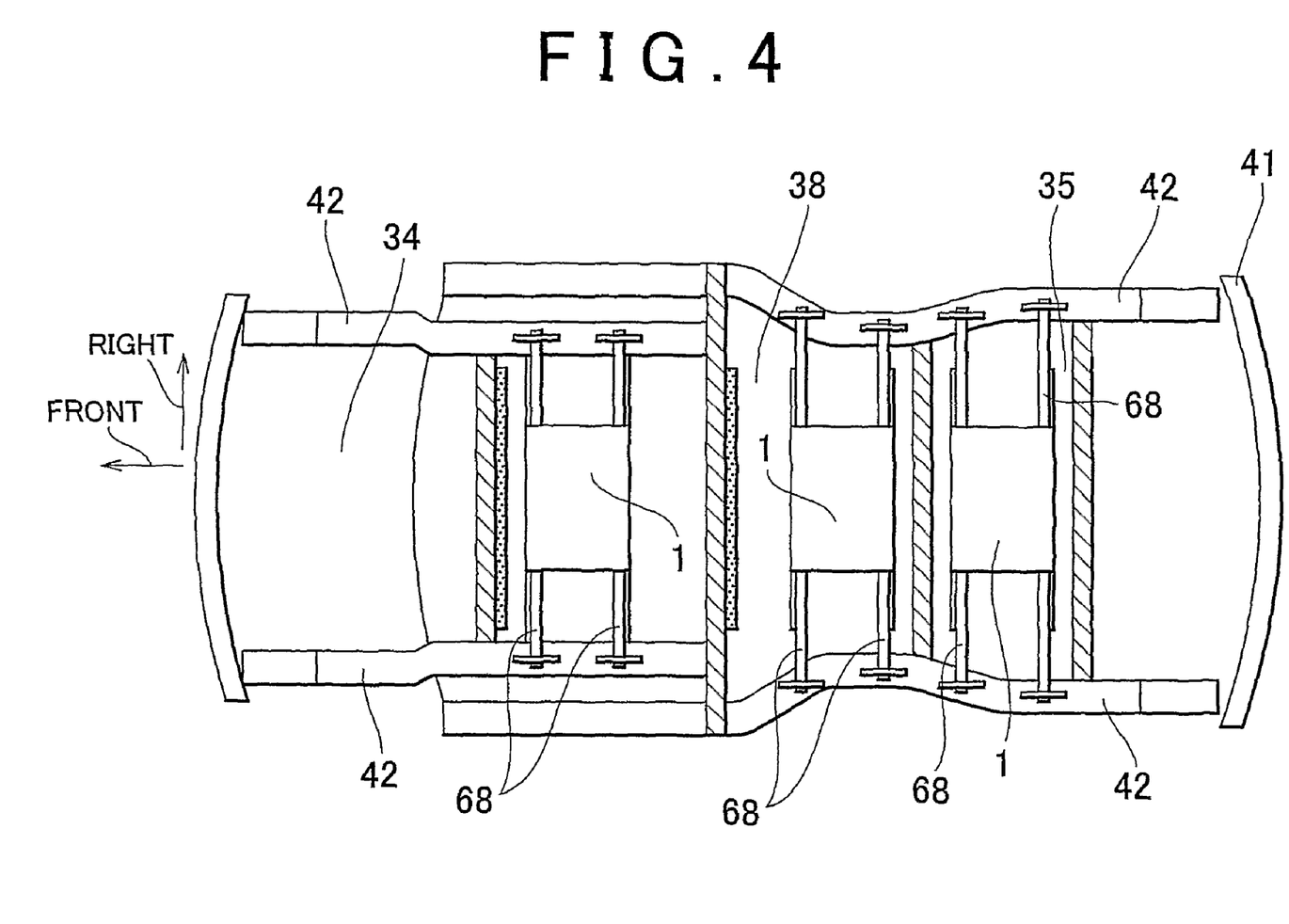
FIG. 4 is a plain view of a fuel cell vehicle to which the fuel cell unit is mounted.
Figure 5:
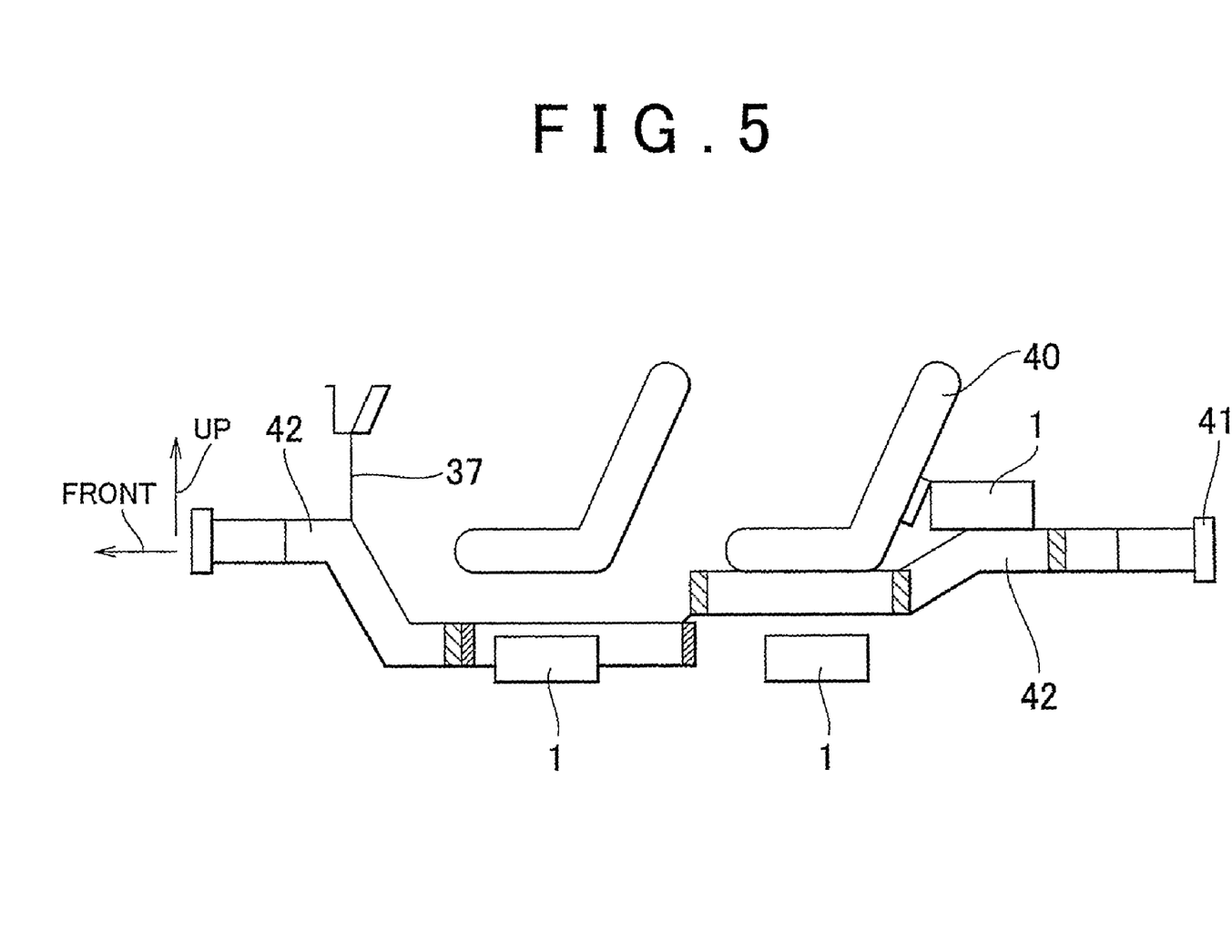
FIG. 5 is a sectional side view of the fuel cell vehicle shown in FIG. 4.

As shown in FIGS. 4 and 5, the fuel cell unit 1 can be mounted, for example, in a space in front of or at the rear of a passenger room 38 of a vehicle (hereinafter referred to as "front space 34" and "rear space 35", respectively) or under the floor of the vehicle. When the fuel cell unit 1 is mounted in the front space 34 or the rear space 35, the fuel cell unit 1 is arranged close to the passenger room 38. Specifically, when the fuel cell unit 1 is provided in the front space 34, the fuel cell unit 1 is arranged right in front of a dash panel 37 shown in FIG. 5. Likewise, when the fuel cell unit 1 is provided in the rear space 35, the fuel cell unit 1 is arranged right behind a rear seat 40 and in front of a rear bumper 41, as shown in FIG. 5. As shown in FIGS. 4 and 6, the fuel cell unit 1 is fixed to the members 68 provided between side members 42 through the mounting insulators 15A, 15B, 15C. In the embodiment, as shown in FIG. 6, the fuel cell unit 1 is mounted in the vehicle such that the side of the fuel cell unit 1 in which the system auxiliary 10 and the distributor pipe 11 are provided faces the rear side of the vehicle.

The structure of the mounting insulator 15A, which is one example of the supporting members according to the invention, will be described with reference to FIGS. 6 to 8. It should be noted that the structures of the mounting insulators 15B, 15C are substantially identical to the structure of the mounting insulator 15A, and therefore the explanation thereof will be omitted.

Figure 7:
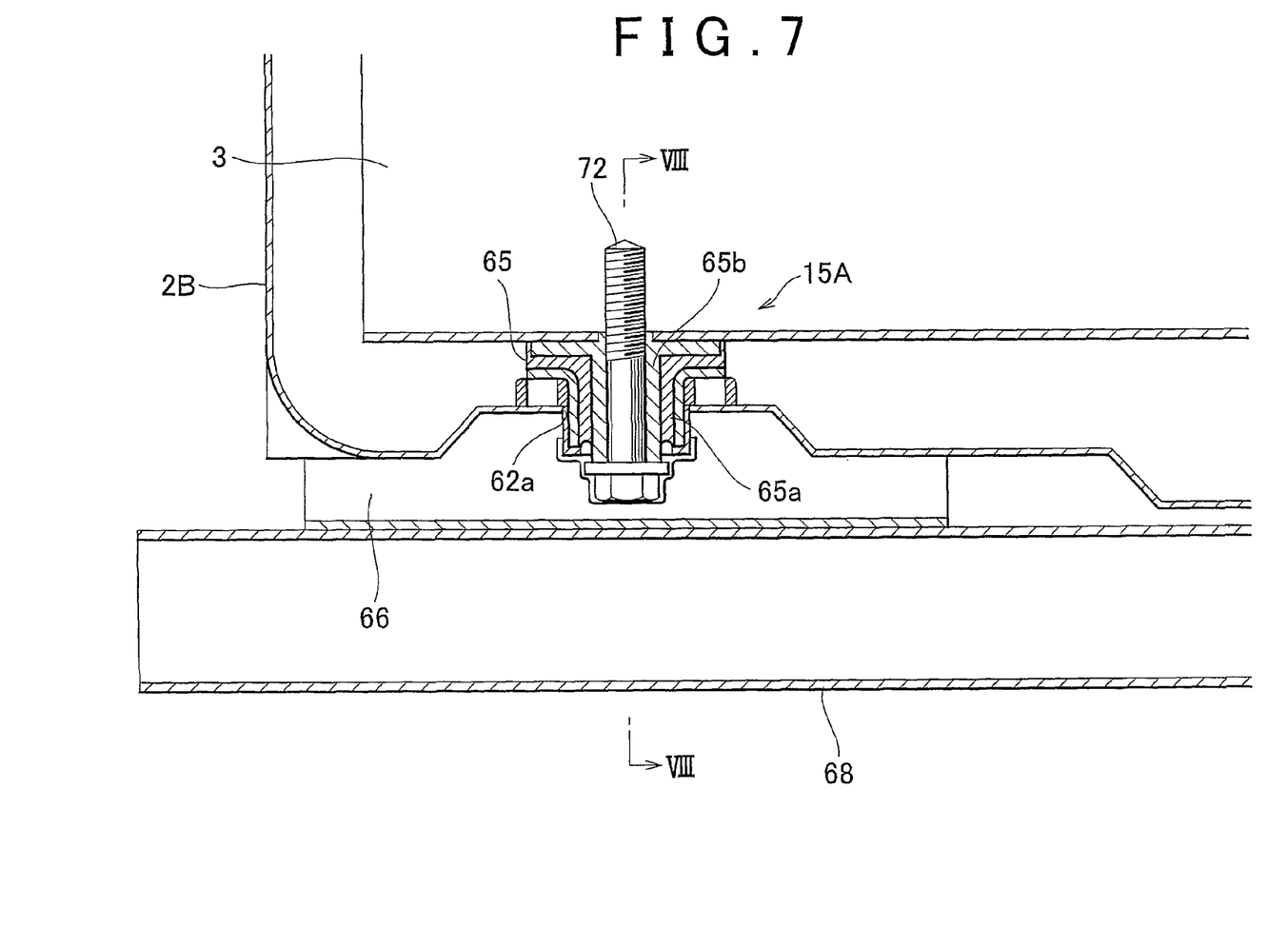
FIG. 7 is an enlarged sectional view of one of the mounting insulators shown in FIG. 6.
Figure 8:
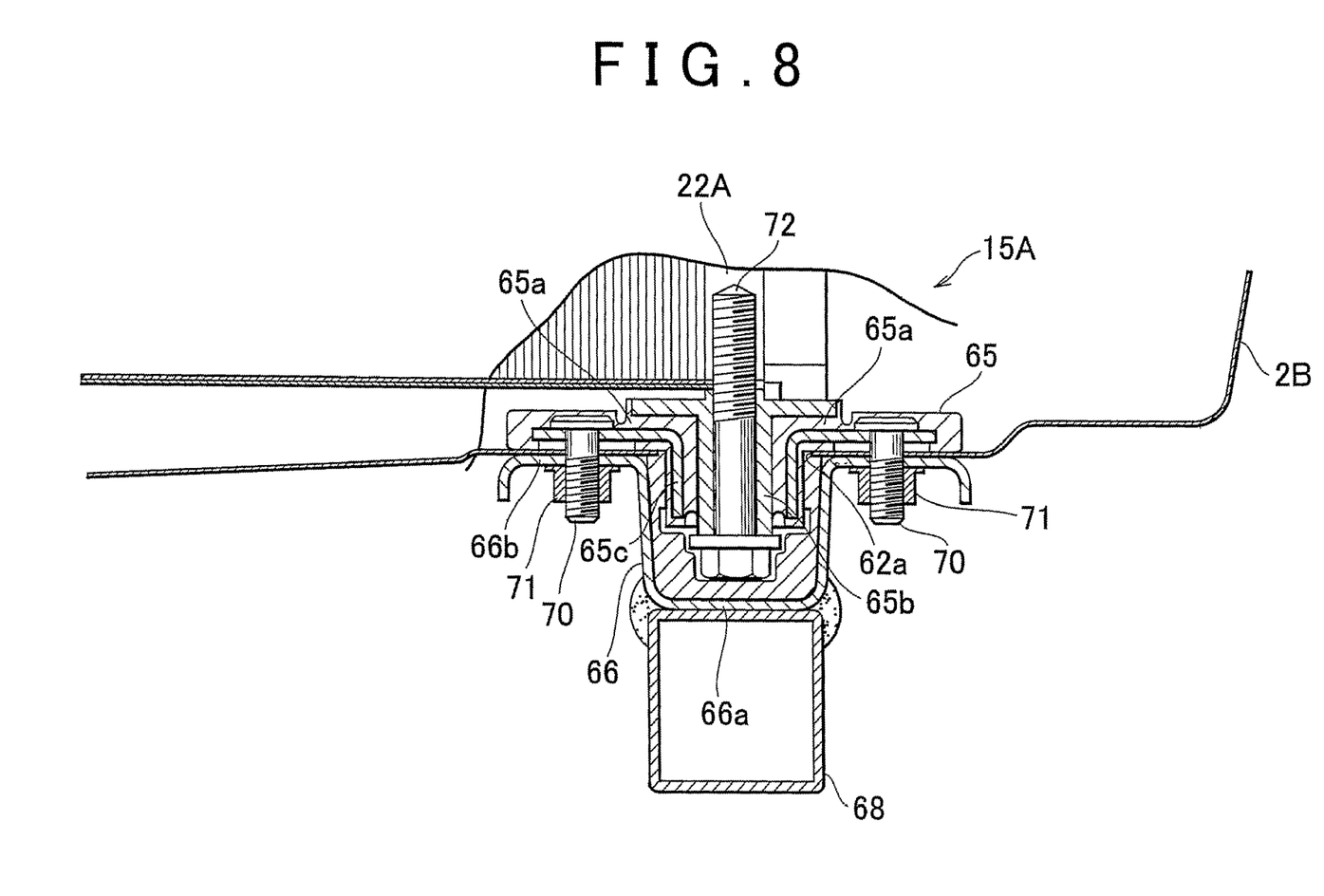
FIG. 8 is a cross-sectional view taken along the line VIII-VIII in FIG. 7.

As shown in FIGS. 6 to 8, the mounting insulator 15A includes a first supporting member 65 and a second supporting member 66. The first supporting member 65 is provided in the upper side of the bottom plate of the lower case 2B of the fuel cell case 2, so that the fuel cell module 3 is supported on the bottom plate of the fuel cell case 2 via the first supporting member 65. The first supporting member 65 is one example of a module supporting member in the invention. The second supporting member 66 is provided outside the fuel cell case 2, so that the lower case 2B of the fuel cell case 2 is supported on the members 68 via the second supporting member 66. The second supporting member 66 is one example of a case supporting member in the invention. As shown in FIGS. 6 to 8, the second supporting member 66 is arranged vertically below the first supporting member 65.

As shown in FIGS. 7 and 8, the first supporting member 65 includes a seat plates 65a that are fixed to the lower case 2B of the fuel cell case 2 by bolts 70 and nuts 71, and a base member 65b that is arranged next to and in contact with the seat plate 65a. Insertion holes into which a bolt 72 is inserted are formed through the lower case 2B of the fuel cell case 2 and the base member 65b of the first supporting member 65, respectively. The bolt 72 is inserted into the insertion holes from below and then fixed to the end plate 22A of the fuel cell module 3 by tightening the threaded portion of the bolt 72 into a thread hole that is formed in the end plate 22A. In this manner, the first supporting member 65 is fixed to the fuel cell module 3. Further, an insulator 65c is provided inside the seat plate 65a. The insulator 65c creates insulation between the end plate 22A and the fuel cell case 2.

As shown in FIGS. 6 to 8, the second supporting member 66 has a hat-shaped cross-section in which a center portion 66a protrudes downward. The second supporting member 66 includes flange portions 66b on both sides of the upper portion of the center portion 66a. The center portion 66a is welded at its bottom side to the members 68. Insertions holes into each of which the bolt 70 is inserted are formed through the flange portions 66b of the second supporting member 66, the seat plates 65a of the first supporting member 65, and the lower case 2B. The lower case 2B is sandwiched between the flange portions 66b and the seat plates 65a, and the bolts 70 are inserted into the insertion holes from above and then fastened with the nuts 71. In this manner, the first supporting member 65 and the fuel cell case 2 are fixed to the second fixing member 66 and the members 68. Since the fuel cell module 3 is fixed to the first supporting member 65, the entire fuel cell unit 1 (the fuel cell case 2 and the fuel cell module 3) is fixed to the members 68.

Since the first supporting member 65 and the second supporting member 66 are structured as above, the load of the fuel cell module 3 acts on the members 68 through the first supporting member 65 and the second supporting member 66. The sealing performance of the fuel cell case 2 can be improved by providing a sealing material, such as a gasket, between the second supporting member 66 and the lower case 2B.

In the fuel-cell-equipped apparatus according to the embodiment described above, the fuel cell unit 1 is supported at two points in the distributor pipe 11 side that is close to the gravity center G of the fuel cell unit 1 (that is, at two points near the side face of the fuel cell unit 1 that is closest to the gravity center G), and at one point near the side face of the fuel cell unit 1 which is opposite to the side face closest to the gravity center. Therefore, the load acting on the supporting points can be distributed to each of the supporting points, and therefore becomes small. In this manner, the fuel cell unit 1 is supported at the three points, and therefore the mounting insulators 15A to 15C that serve as the supporting members can be made small in size. As a result, it becomes easier to mount the fuel cell unit 1 and its accessories. Further, since the plane defined by the supporting points can be uniquely identified, the direction and distance of the movement of the plane can be easily estimated. This makes it possible to optimize the configuration of the fuel cell case 2, and there is no need to unnecessarily enlarge the outer dimensions of the fuel cell case. As a result, the fuel cell unit 1 can be made small in size, and the fuel cell unit 1 can be easily mounted.

Further, in the fuel-cell-equipped apparatus according to the embodiment described above, the supporting members (the mounting insulators 15A, 15B) are positioned in the areas in the distributor pipe 11 side other than the area around the boundary between the rows of the fuel cell stack 7. Therefore, a space for mounting the accessories and the pipe can be created around the boundary between the rows of the fuel cell stack 7. As a result, it becomes easier to install the accessories. It should be noted that, while the fuel cell stack 7 includes the multiple rows of cells, it may include only one.

In the fuel-cell-equipped apparatus according to the embodiment described above, the mounting insulators 15A, 15B are provided near the ends of the end plate 22A so that the two supporting points in the distributor pipe 11 side are distant from each other. This makes it possible to support the fuel cell more stably.

In the fuel-cell-equipped apparatus according to the embodiment described above, each of the supporting members (the mounting insulators 15A to 15C) includes the first supporting member 65 and the second supporting member 66, and the second supporting member 66 is arranged vertically below the first supporting member 65. Therefore, the load of the fuel cell module 3 acts on the members 68 through the first supporting member 65 and the second supporting member 66. That is, it is possible to match the position on which the load of the fuel cell module 3 acts and the position on which the load of the entire fuel cell unit 1 acts. Therefore, an extra load to the fuel cell case 2 (bending moment and the like), which is produced due to a difference between the position on which the load of the fuel cell module 3 acts and the position on which the load of the entire fuel cell unit 1 acts, can be reduced. As a result, the fuel cell case 2 can be made thin, and the entire fuel cell unit 1 can be made light in weight and small in size.

While in the foregoing embodiment the mounting insulator includes more than one member (i.e., the first supporting member 65 and the second supporting member 66), the mounting insulator may consist of a single member having generally a hollow square cross section. Further, in the embodiment, the mounting insulator is employed as one example of the supporting member according to the invention. The structure of the supporting member, however, is not limited to the structure of the embodiment, and other various mounting members including an elastic member or portion may be employed as the supporting member.

While in the foregoing embodiment the fuel cell case includes the upper case and the lower case, the structure of the fuel cell case is not limited to the structure of the embodiment. Further, in the embodiment, the invention is applied to the fuel cell unit including the fuel cell case. The invention, however, may be applied to a fuel cell unit that includes a fuel cell module and accessories, but not a fuel cell case for housing the fuel cell module. In this case, the fuel cell unit may be supported at three points on, for example, the upper side of the bottom plate of a case which corresponds to the "base" described above, and the case that houses the fuel cell unit may be supported at four points on a certain part.

In the embodiment above, the invention is applied to the case where the fuel-cell-equipped apparatus is structured such that the fuel cell is mounted on the base of the fuel cell vehicle. The invention, however, may be applied to other cases where the fuel-cell-equipped apparatus is structured such that the fuel cell is mounted on the base in various types of apparatuses (such as robots, ship and vessel, aircraft and the like), as well as fuel cell vehicles.

In the foregoing embodiment, because the gravity center of the fuel cell unit 1 is in the side where the distributor pipe 11 is provided due to its relatively heavy weight, the end plate 22A in the distributor pipe 11 side is supported at two points and the end plate 22B in the other side is supported at one point. The invention, however, is not limited to such arrangement. For example, if an auxiliary component is provided in the other side and the gravity is therefore in there, rather than in the distributor pipe 11 side, the end plate 22B may alternatively be supported at two points. Further, while the end plates 22A, 22B are supported in the foregoing embodiment, the invention is not limited to such arrangement. For example, if a tensioning member, such as a tension plate, is provided so as to bridge between the end plates 22A, 22B and thus clamp the fuel cell stack, a portion of the tensioning member in the side closer to the gravity center of the fuel cell unit 1 may be supported at two points and a portion in the other side may be supported at one point. Also, while, in the foregoing embodiment, the fuel cell unit 1 is supported at three points from below, it may alternatively be supported from above. That is, as long as the fuel cell unit 1 is supported at two points in its gravity center side and at one point in the other side, various other structures and arrangements can be employed to achieve the effects and advantages obtained in the foregoing embodiment.

The invention claimed is:

1. A fuel-cell-equipped apparatus, comprising:
 a fuel cell unit including a fuel cell stack including a plurality of cells which are stacked on each other and a pipe that is provided at or near an end of the fuel cell stack in a direction that the cells are stacked; and
 mounting members via which the fuel cell unit is supported on a base, the fuel cell unit being supported on the base at only two points at a side of the fuel cell unit where the pipe is provided and at only one point at a side of the fuel cell unit that is opposite to the side where the pipe is provided, wherein
 the fuel cell unit includes a fuel cell module including the fuel cell stack and a fuel cell case that houses the fuel cell module, wherein the mounting members support the fuel cell case on the base and the same mounting members support the fuel cell module inside the fuel cell case, and
 the side of the fuel cell unit where the pipe is provided corresponds to a side of the fuel cell unit closest to a center of gravity of the fuel cell unit.

2. The fuel-cell-equipped apparatus according to claim 1, wherein
 the fuel cell stack is arranged in at least two rows,
 a pair of end plates are provided to clamp the rows of the fuel cell stack from both sides, where the end plate provided at the side where the pipe is provided is arranged or formed so as to cover ends of all the rows of the fuel cell stack at the same side.

3. The fuel-cell-equipped apparatus according to claim 2, wherein
the mounting members provided at the side where the pipe is provided are positioned in an area other than a boundary between the rows of the fuel cell stack and a proximity thereof.

4. The fuel-cell-equipped apparatus according to claim 2, wherein
the mounting members provided at the side where the pipe is provided are fixed to the end plate provided at the same side at positions close to ends of the end plate, respectively.

5. The fuel-cell-equipped apparatus according to claim 1, wherein
the two points at which the fuel cell unit is supported on the base include two points close to a side face of the fuel cell case that is closest to the center of gravity of the fuel cell unit, and
the one point at which the fuel cell unit is supported on the base includes a point close to a side face of the fuel cell case that is opposite to the side face closest to the center of gravity of the fuel cell unit.

6. The fuel-cell-equipped apparatus according to claim 1, wherein
at least one of the mounting members includes a case supporting member which is provided below a bottom plate of the fuel cell case and via which the fuel cell case is supported on the base and a module supporting member which is provided on the bottom plate of the fuel cell case and via which the fuel cell module is supported on the bottom plate in the fuel cell case.

7. The fuel-cell-equipped apparatus according to claim 6, wherein
the case supporting member and the module supporting member have a common axis along a vertical direction.

8. The fuel-cell-equipped apparatus of claim 1, wherein the fuel cell stack comprises a pair of end plates, and wherein each mounting member comprises:
a bolt that is inserted into an end plate of the fuel cell stack;
a module supporting member located inside the fuel cell case and that supports the fuel cell module; and
a case supporting member located outside the case and that supports the fuel cell case.

9. A fuel-cell-equipped apparatus, comprising:
a fuel cell unit; and
mounting members via which the fuel cell unit is supported on a base, the fuel cell unit being supported on the base at only two points at a side of the fuel cell unit that is closest to a center of gravity of the fuel cell unit and at only one point at a side of the fuel cell unit that is opposite to the side closest to the center of gravity of the fuel cell unit, wherein the fuel cell unit includes a fuel cell module including a plurality of cells stacked on each other and a fuel cell case that houses the fuel cell module, wherein the mounting members support the fuel cell case on the base and the same mounting members support the fuel cell module inside the fuel cell case.

10. The fuel-cell-equipped apparatus according to claim 9, wherein
the two points at which the fuel cell unit is supported on the base include two points close to a side face of the fuel cell case that is closest to the center of gravity of the fuel cell unit, and the one point at which the fuel cell unit is supported on the base includes a point close to a side face of the fuel cell case that is opposite to the side face closest to the center of gravity of the fuel cell unit.

11. The fuel-cell-equipped apparatus according to claim 9, wherein
at least one of the mounting members includes a case supporting member which is provided below a bottom plate of the fuel cell case and via which the fuel cell case is supported on the base and a module supporting member which is provided on the bottom plate of the fuel cell case and via which the fuel cell module is supported on the bottom plate in the fuel cell case.

12. The fuel-cell-equipped apparatus according to claim 11, wherein
the case supporting member and the module supporting member have a common axis along a vertical direction.

13. The fuel-cell-equipped apparatus of claim 9, wherein the fuel cell module comprises a pair of end plates, and wherein each mounting member comprises:
a bolt that is inserted into an end plate of the fuel cell module;
a module supporting member located inside the fuel cell case and that supports the fuel cell module; and
a case supporting member located outside the case and that supports the fuel cell case.

* * * * *

UNITED STATES PATENT AND TRADEMARK OFFICE
CERTIFICATE OF CORRECTION

PATENT NO. : 8,361,669 B2  
APPLICATION NO. : 11/989638  
DATED : January 29, 2013  
INVENTOR(S) : Haruhisa Niimi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1397 days.

Signed and Sealed this

First Day of September, 2015

Michelle K. Lee
*Director of the United States Patent and Trademark Office*